(12) United States Patent
McCausland

(10) Patent No.: US 7,419,132 B2
(45) Date of Patent: Sep. 2, 2008

(54) BLADDER VALVE

(75) Inventor: Andrew John McCausland, Milperra (AU)

(73) Assignee: Goyen Controls Co. Pty Ltd., Norwa (AU)

( * ) Notice: Subject to any disclaimer, the term of this patent is extended or adjusted under 35 U.S.C. 154(b) by 220 days.

(21) Appl. No.: 10/546,337

(22) PCT Filed: Feb. 27, 2004

(86) PCT No.: PCT/AU2004/000256

§ 371 (c)(1),
(2), (4) Date: Dec. 12, 2005

(87) PCT Pub. No.: WO2004/076897

PCT Pub. Date: Sep. 10, 2004

(65) Prior Publication Data
US 2006/0124879 A1 Jun. 15, 2006

(30) Foreign Application Priority Data
Feb. 27, 2003 (AU) .............................. 2003900909

(51) Int. Cl.
*F16K 7/10* (2006.01)
(52) U.S. Cl. .......................................... 251/5; 251/61.1
(58) Field of Classification Search .................. 251/5, 251/61.1, 61
See application file for complete search history.

(56) References Cited
U.S. PATENT DOCUMENTS

| | | | | |
|---|---|---|---|---|
| 2,406,243 A | * | 8/1946 | Newton et al. ............... | 251/118 |
| 2,749,084 A | * | 6/1956 | Townsend ................... | 251/183 |
| 2,817,357 A | | 12/1957 | Luce | |
| 3,574,310 A | * | 4/1971 | Souriau ..................... | 251/61.1 |
| 3,624,801 A | * | 11/1971 | Gannon ..................... | 251/5 |
| 4,186,764 A | * | 2/1980 | Ottersen et al. ............ | 251/61.1 |
| 4,342,336 A | * | 8/1982 | Satterthwaite et al. ........ | 138/90 |
| 4,520,993 A | * | 6/1985 | Schertler .................... | 251/5 |
| 4,785,841 A | | 11/1988 | Breckner | |
| 4,787,408 A | * | 11/1988 | Twerdochlib ............... | 251/61.1 |
| 4,826,132 A | * | 5/1989 | Moldenhauer ............... | 251/368 |
| 4,840,191 A | * | 6/1989 | Gausman et al. ............ | 251/61.1 |
| 5,240,031 A | | 8/1993 | Vigil | |
| 5,538,028 A | * | 7/1996 | Lombardo .................. | 251/122 |

FOREIGN PATENT DOCUMENTS

| | | |
|---|---|---|
| AU | 31948/77 | 6/1979 |
| DE | 1060205 | 8/1959 |

(Continued)

Primary Examiner—John Bastianelli
(74) Attorney, Agent, or Firm—Daniel N. Daisak

(57) ABSTRACT

A bladder valve (10) is disclosed which comprises a valve body (12) having an inlet (16), an outlet (14) and a flow passage (17) connecting the inlet (16) and the outlet (14). The bladder valve (10) also includes a valve seat (45) surrounding the flow passage (17) and an inflatable bladder (22) mounted in the flow passage (17) and being connectable to a source of fluid under pressure in use. The bladder (22) is mounted on a bladder support member (34) which provides support for the bladder when in its deflated condition, and through which inflation passages (42) pass for the inflation and deflation of the bladder. The bladder (22) is designed to collapse or deflate rapidly in order to open the valve, enabling the valve to be used in applications such as reverse pulse cleaning of filter elements.

12 Claims, 6 Drawing Sheets

FOREIGN PATENT DOCUMENTS

| | | |
|---|---|---|
| EP | 0 338 645 | 10/1989 |
| FR | 1244750 | 10/1960 |
| GB | 643 991 | 10/1950 |
| GB | 2079898 | 1/1982 |
| GB | 2331796 | 6/1999 |
| JP | 07176520 | 6/1995 |
| JP | 08170739 | 7/1996 |

* cited by examiner

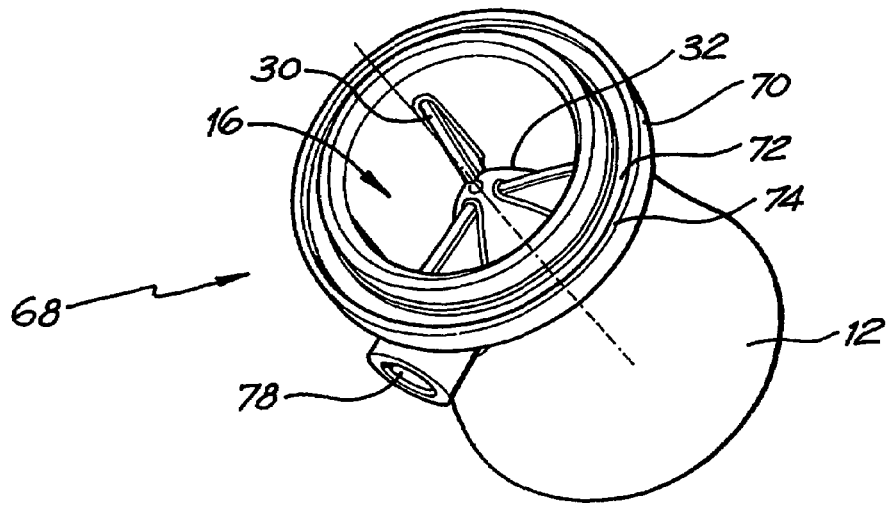
FIG. 14
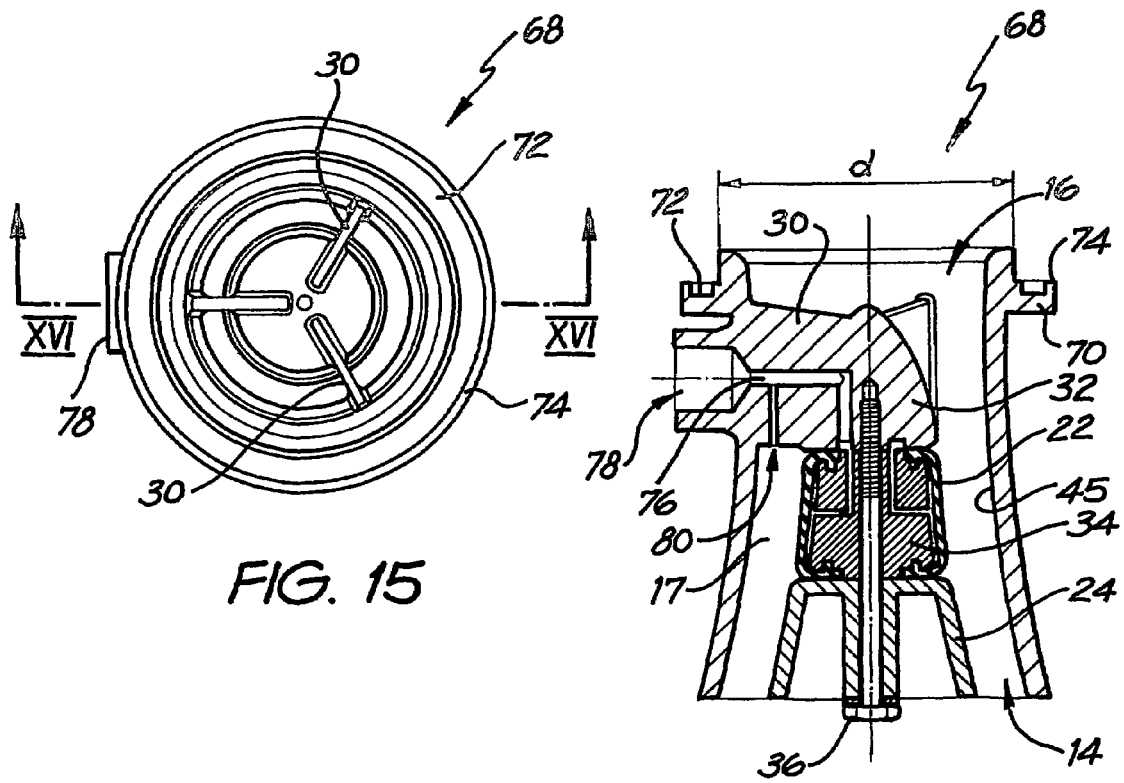
FIG. 15
FIG. 16

BLADDER VALVE

TECHNICAL FIELD

The present invention relates to a bladder valve of the type which can be used to control fluid flow. The invention will be particularly described with reference to a valve suitable for providing a high pressure reverse pulse of air in a filter cleaning system, but it is to be understood that the invention has wider application.

BACKGROUND OF THE INVENTION

Prior art bladder valves have suffered from various deficiencies, including being slow to open and close, inadequate sealing, obstructive flow passages, fragile bladders, and complexity of operation. In applications such as reverse pulse cleaning of filter elements it is important that there is a minimum pressure drop across the valve. It is also important that the valve is able to contain the relatively high pressure air used to provide the cleaning pulse, but will open rapidly so as to ensure a sharp peak pressure/energy pulse will pass through the valve to provide optimum cleaning effect. Prior art bladder valves have frequently not performed adequately, at least in some situations, for one or more of these reasons.

One known prior art bladder valve includes an inflatable bladder provided within a conduit in which liquids flow past the bladder. The bladder is loosely mounted within the conduit by a reinforced hook attached to a hose that is coupled to a source of pressurised air which is used to inflate the bladder to thereby close the valve and prevent passage of liquid through the conduit To deflate the bladder valve, air is removed from the bladder via the hose to thereby open the valve and allow liquid to flow through the conduit.

A problem with this prior art bladder valve is that the inflatable bladder is in direct contact with fluid flowing through the conduit which can cause wear and tear on the bladder.

Other bladder valves have a problem in that the bladder is asymmetrically mounted in the conduit in which it is located, and this can result in uneven opening, and thus a dissipated pressure/energy pulse passing through the valve.

SUMMARY OF INVENTION

According to the invention, there is provided a bladder valve comprising:

a valve body having an inlet, an outlet and a flow passage connecting the inlet and outlet the inlet, outlet and flow passage being in axial alignment with each other;

a valve seat surrounding said flow passage;

a mounting hub fixed to the body within the flow passage and being axially aligned with the flow passage;

a bladder support member extending downstream of said hub, said bladder support member being generally cylindrical configuration and being coaxially aligned with said flow passage;

a bladder surrounding said bladder support member, said bladder being inflatable from a deflated condition in which the inner surface of the bladder is in contact with and supported by the bladder support member and the flow passage is open and an inflated condition in which the outer surface of the bladder is in contact with the said valve seat and the flow passage is closed;

an inflation passage extending through said hub and said bladder support member for inflating said bladder, wherein in use, said bladder is inflated by fluid under pressure passing through said inflation passage to thereby inflate said bladder and wherein release of said fluid under pressure deflates said bladder.

The mounting hub is preferably of cone or cowl shape diverging in a direction from the inlet to the outlet. The diameter of the hub at its widest point is preferably substantially the same as the diameter of the bladder support member.

The bladder support member may be mounted to the hub, the connection arrangement between the hub and the support member being such that the bladder is clamped between the hub and the bladder support member.

Preferably the valve includes a shroud on the outlet side thereof which is axially aligned with the outlet, the shroud being mounted to the hub. The bladder may be of tubular or cylindrical configuration with opposite ends open, one end being clamped between the bladder support member and the hub, and the opposite end being clamped between the bladder support member and the shroud. Each end of the bladder may each have an annular sealing ring integrally formed therewith, said sealing rings being located in corresponding annular grooves in the hub and/or the bladder support, and/or the shroud respectively. The shroud and bladder support may be mounted to the hub by means of a connection rod which passes through the shroud and bladder support member into the hub.

The hub is preferably mounted to the valve body by means of a plurality of fixed vanes or web members which extend radially between the hub and the valve body. The inflation passage preferably extends along one of said vanes or web members. The inflation passage preferably also serves as an exhaust passage for deflating the bladder. Optionally the inflation passage bifurcates into two arms at a point along its length at a position remote from the bladder support, one arm serving as an inlet passage for the supply of fluid under pressure, and the other arm serving as an exhaust passage through which fluid is evacuated from the bladder to deflate the bladder. The inlet passage may include a narrow diameter throat, to restrict the flow of fluid into the bladder, the exhaust passage not being so restricted so that the evacuation of fluid from the bladder is relatively unrestricted. The inlet passage may be operable to be permanently connected to a source of fluid under pressure in use, and the exhaust passage may be connected to switch or valve means, operable between open and closed conditions, the bladder being inflated when the exhaust passage is closed, and deflated when the exhaust passage is opened, fluid under pressure bleeding from the inlet passage to the exhaust passage when the exhaust passage is open.

The inflation passage may divide to a plurality of outlet nozzles in the bladder support member, the outlet nozzles radially spaced around the bladder support member to facilitate even inflation and deflation of the bladder.

The bladder support member may be coupled to the wall of said fluid passage by at least one web member such that said bladder is aligned with a cental axis of said flow passage.

These and further features of the invention will be made apparent from the description of an embodiment of the invention which is given below by way of example. In the description reference is made to the accompanying drawings, but the specific features shown in the drawings should not be construed as limiting on the invention.

BRIEF DESCRIPTION OF DRAWINGS

FIG. 14 shows a perspective view of a second embodiment of valve according to the invention from the inlet side of the valve;

FIG. 15 shows a plan view of the valve shown in FIG. 14 from the inlet side of the valve; and FIG. 16 shows a cross-sectional view of the valve shown in FIG. 14 along section line XVI-XVI shown in FIG. 15.

DETAILED DESCRIPTION OF PREFERRED EMBODIMENT

Figure 12:
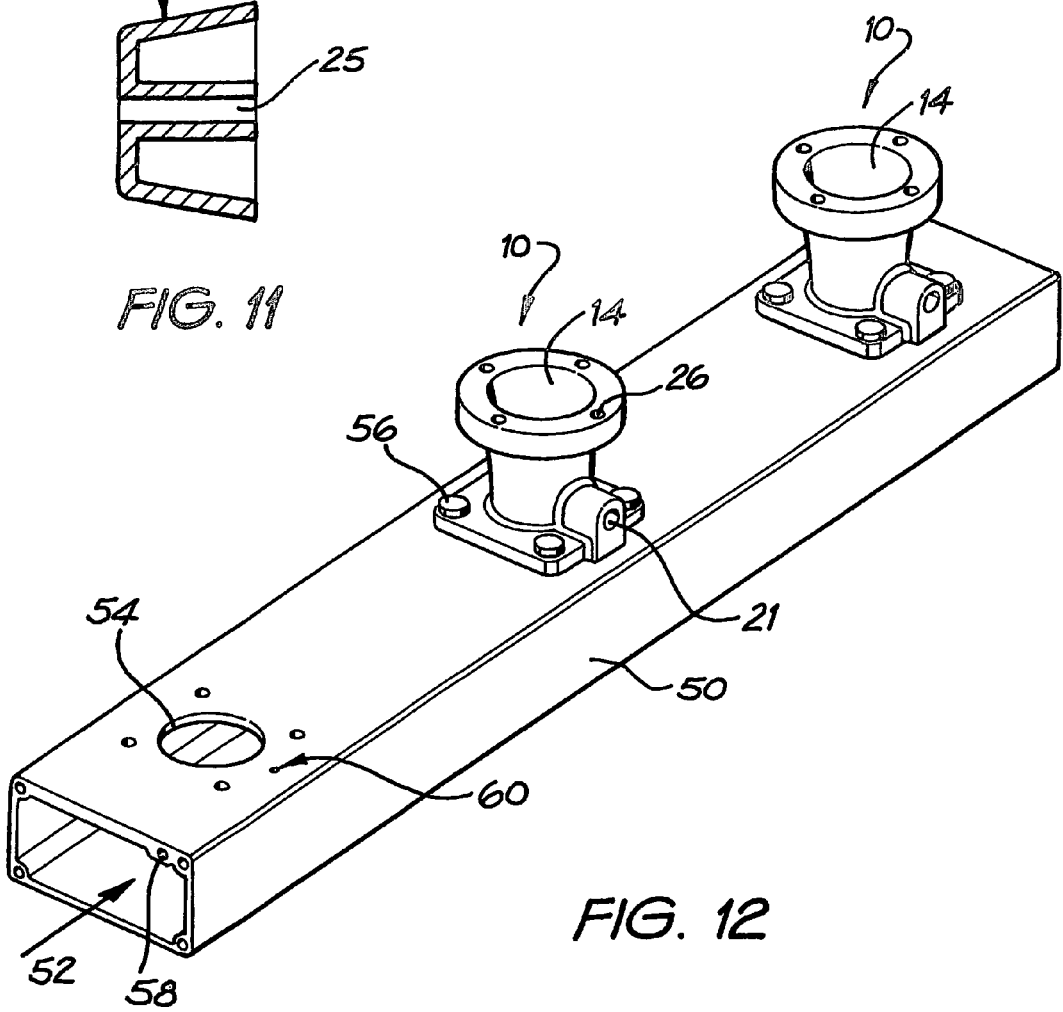
FIG. 12 shows a perspective view of a series of bladder valves of the type shown in FIG. 1 mounted to a box conduit that is used in a reverse pulse cleaning system for cleaning filter bags.

As shown in the drawings a bladder valve 10 comprises a valve body 12 having an inlet 16 and an outlet 14. The valve body 12 includes a mounting flange 18 that is adjacent to the inlet 16 and is of a general square shape. The flange 18 includes four attachment holes 20 that extend through the flange 18 and which are located adjacent to each corner of the flange 18. The holes 20 are used to bolt the valve 10 in position in use, as shown in FIG. 12, and as will be explained further below. Other fixing arrangements are possible in which flange mounts are not used. Threaded connections might be used, or dresser nut style connections. These arrangements could apply at both the inlet and outlet sides of the valve.

A flow passage 17 connects the inlet 16 with the outlet 14. The flow passage, inlet 16 and outlet 14 are axially aligned with each other on axis 15.

The flow passage 17 is of substantially annular configuration, and when the valve is open, offers a relatively unrestricted flow path between the inlet 16 and outlet 14. It will be noted that the flow passage 17 flares outwardly towards the outlet side of the valve.

A hub 32 is mounted in the flow passage 17 adjacent the inlet 16. The hub 32 is cone or cowl shaped to provide for smooth flow of fluid, typically air into the flow passage 17 through the inlet 16. The hub is axially aligned with axis 15 and is held in position by three fixed vanes or web members 30 which extend radially between the body 12 and the hub 32. It is envisaged that the hub could be held in position with a single vane or web member which would have the effect of reducing obstructions in the inlet region of the valve.

The hub 32 has a frusto conical bladder support member 34 mounted thereto in axial alignment with the axis 15 of the valve. The bladder support member supports a tubular bladder 22 in position in the flow passage 17. The manner in which the bladder 22 is held in position is described in more detail below.

An outlet shroud 24 is axially mounted within the flow passage 17 on the outlet end of the bladder support 34. The shroud 24 is of frusto conical shape and diverges in a direction towards the outlet side of the valve. As will be clear from FIG. 5, the inner wall of the valve is parallel to the shroud in the outlet region of the valve, thereby defining an outwardly flared annular configuration for the flow passage 17 in this outlet region. Other arrangements are possible, and in particular it is envisaged that, at least in some applications, and outlet shroud of a different configuration, such as a shroud which converges in the direction towards the outlet will be possible. Optimisation of the flow directing components within the valve is generally done when the specific requirements of the system with which the valve is to be used are known.

The shroud 24 is clamped to the bladder support by means of a threaded bolt 36 which passes through a bore 25 in the shroud, and a bore 35 in the bladder support, engaging in a threaded bore 33 in the hub 32. The bolt 36 thus acts to clamp the hub, bladder support, and shroud together.

Figure 6:
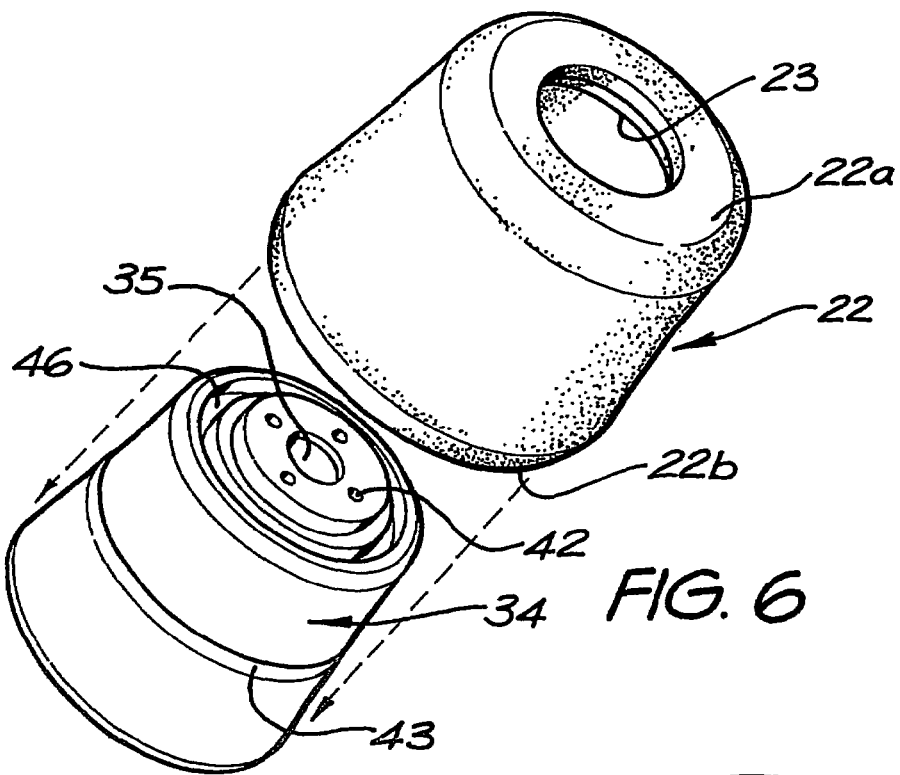
FIG. 6 shows an exploded view of the bladder and bladder support member used in the bladder valve of FIG. 1.
Figure 7:
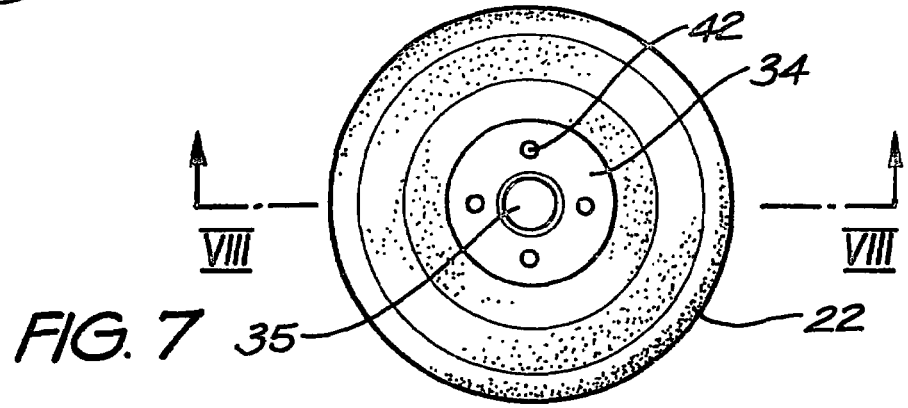
FIG. 7 shows a plan view of the bladder mounted to the bladder support member.
Figure 8:
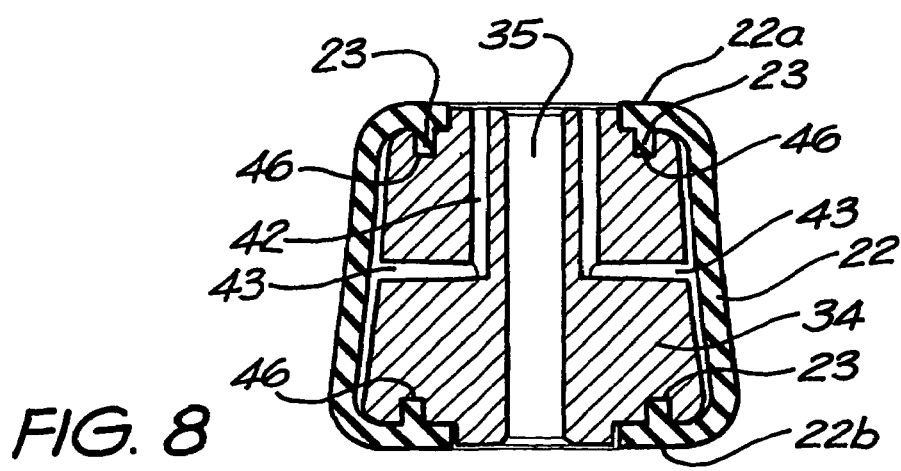
FIG. 8 shows a cross-sectional view of the bladder mounted to the bladder mounting arrangement through the section line VIII-VIII of FIG. 7.
Figure 9:
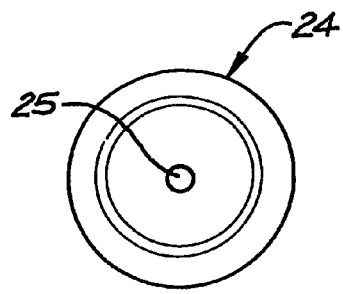
FIG. 9 shows a plan view of the shroud of the valve.
Figure 10:
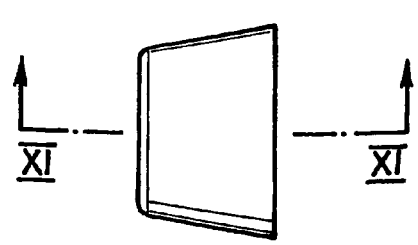
FIG. 10 shows a side view of the shroud of FIG. 9.
Figure 11:
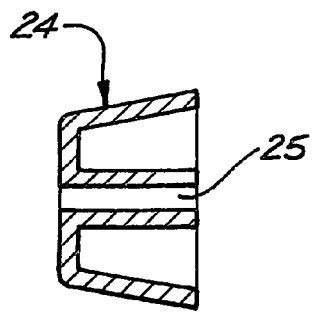
FIG. 11 shows a cross sectional view through of the shroud along the section line XI-XI of FIG. 10.

The bladder 22 is of generally tubular or open ended cylindrical configuration, as clearly shown in FIGS. 6 to 8. The end regions 22a and 22b of the bladder curve inwardly as shown such that the bladder 22 is a relatively tight fit around the bladder support 34. Annular ribs 23 are formed on the inner surface of the end regions 22a and 22b, and these ribs locate in corresponding annular grooves 46 defined in the end faces of the bladder support 34. The ribs 23 are intended to act to secure the bladder 22 in position during inflation, and also to form an air tight seal between the bladder support and the hub and shroud respectively, when the valve is in its assembled condition.

Figure 13:
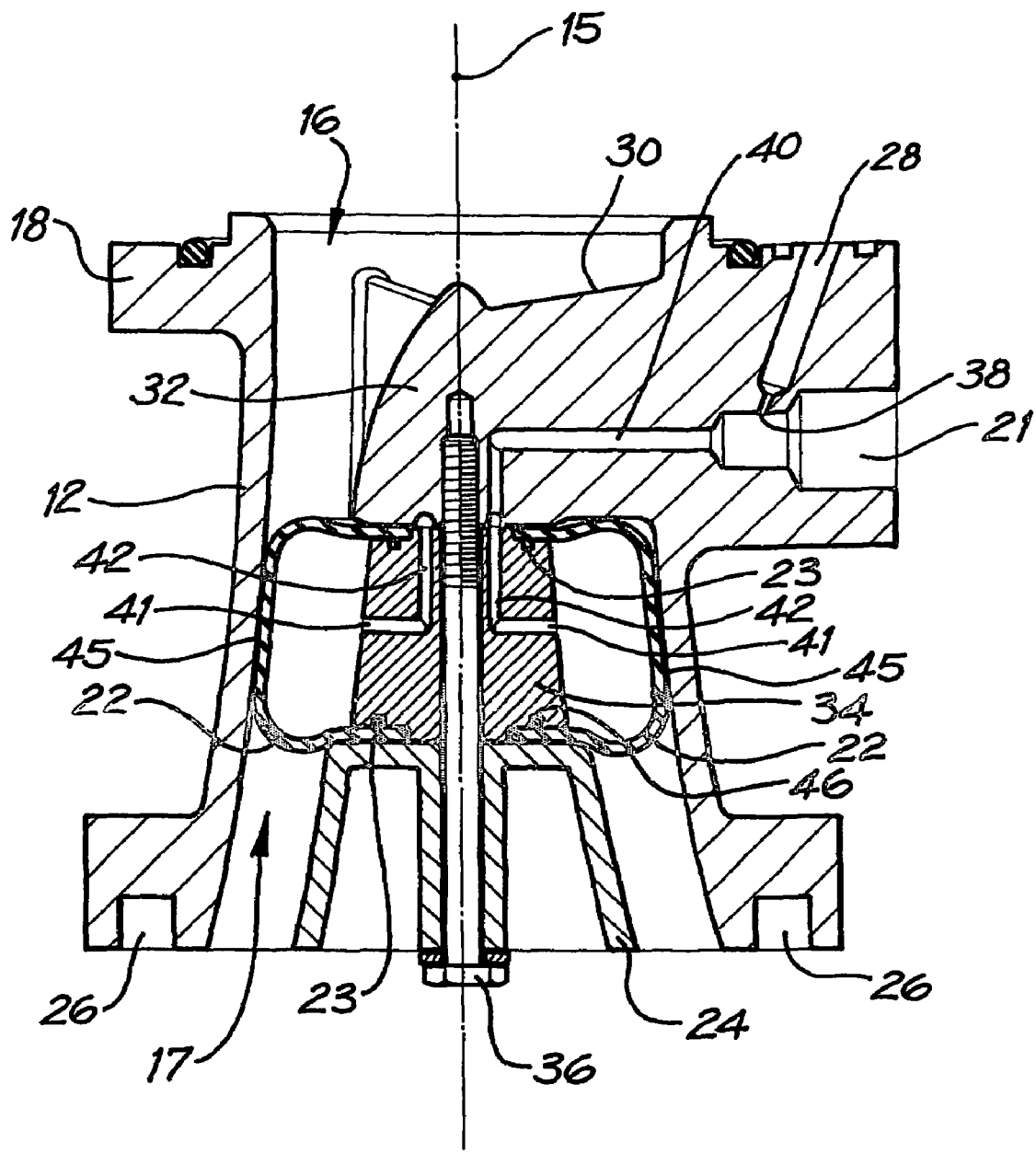
FIG. 13 shows a cross-sectional view along section line V-V of FIG. 4 with the valve in its closed condition.

The bladder 22 is adapted to be inflated, into the position shown in FIG. 13 of the drawings, to thereby seal against the inner wall of the valve body, towards the centre of the valve. The inner wall of the valve body thus defines a valve seat 45 in this region, and the bladder, when expanded or inflated, sealingly engages with this valve seat 45 to close the valve.

Figure 1:
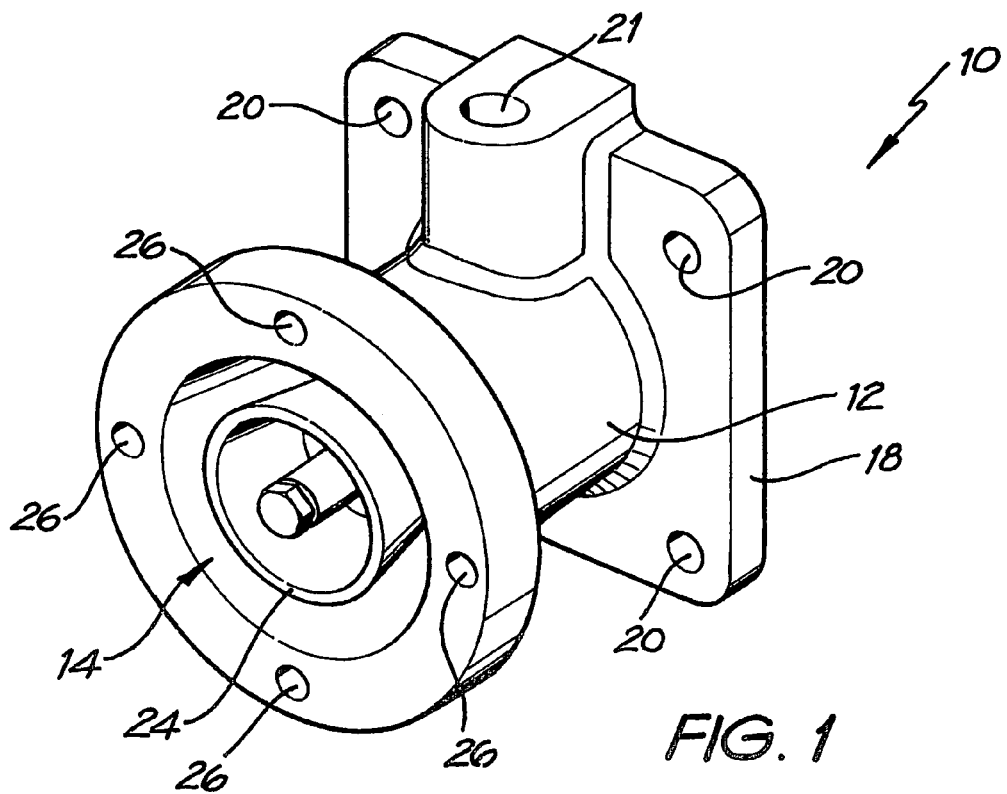
FIG. 1 shows a front perspective view of a preferred embodiment of a bladder valve.
Figure 2:
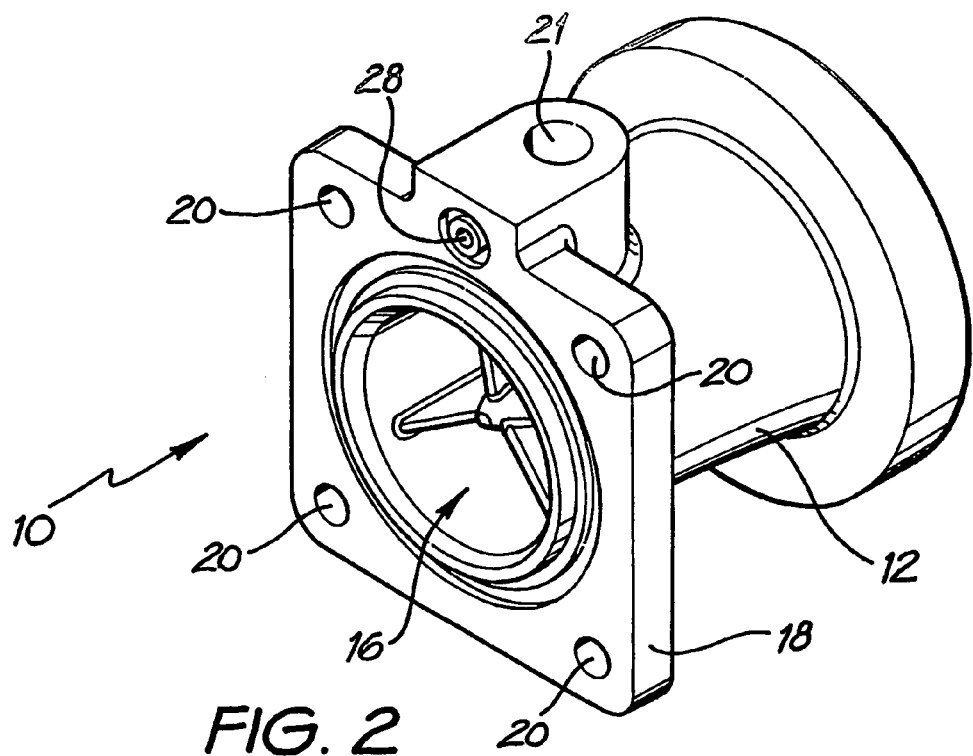
FIG. 2 shows a rear perspective view of the bladder valve shown in FIG. 1.
Figure 3:
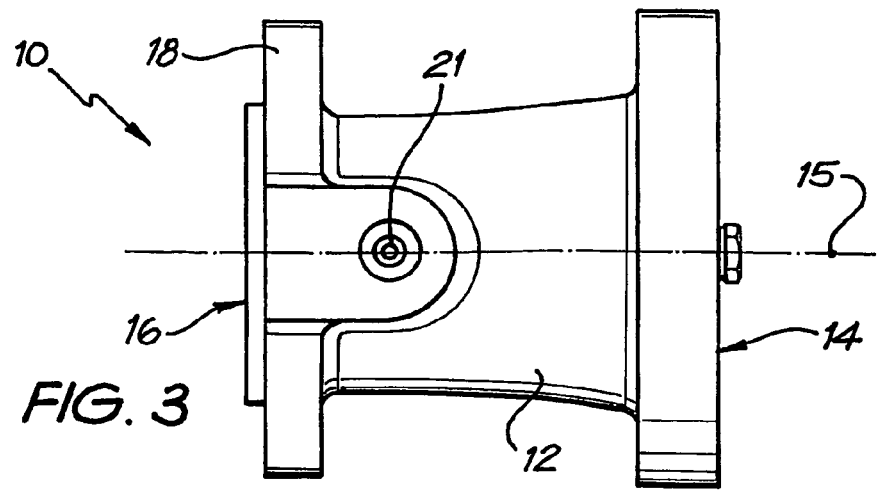
FIG. 3 shows a side view of the bladder valve shown in FIG. 1.
Figure 4:
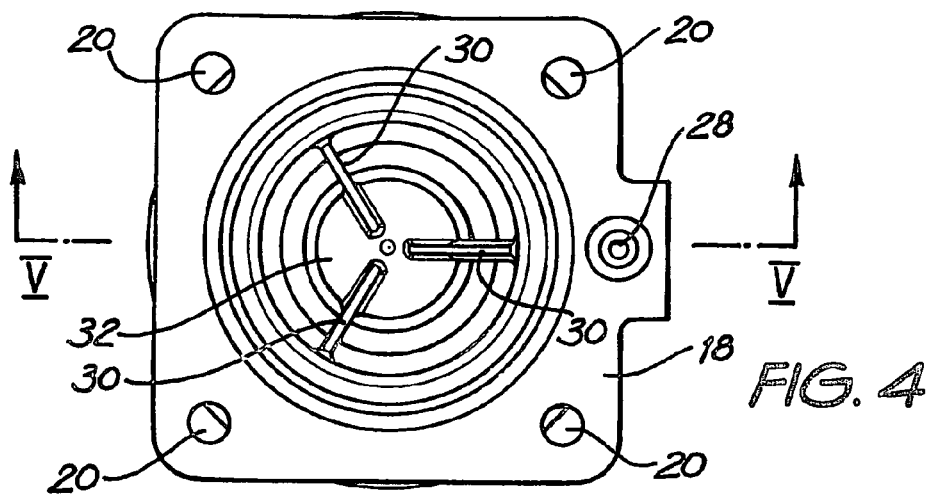
FIG. 4 shows a plan view of the bladder valve of FIG. 1 from the inlet side thereof.
Figure 5:
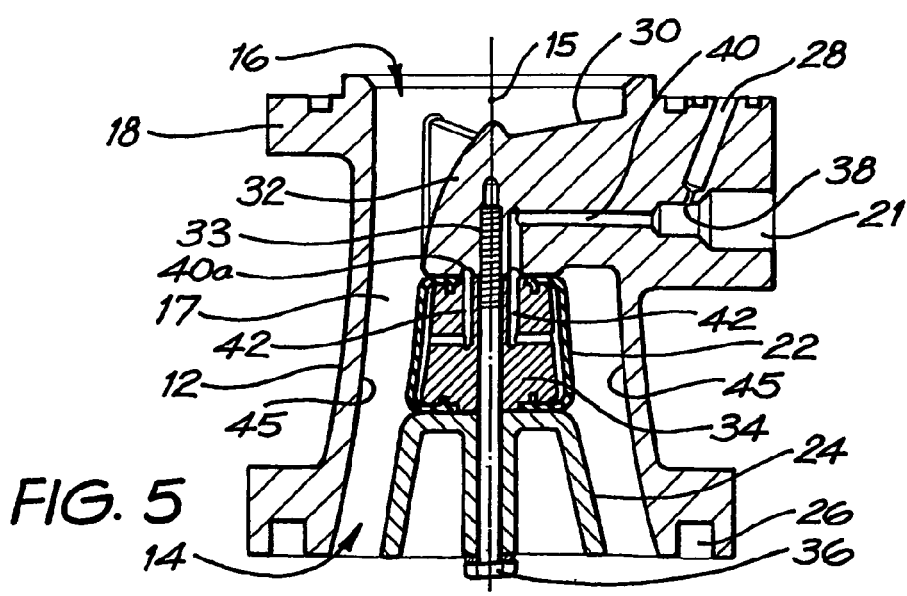
FIG. 5 shows a cross sectional view along section line V-V shown in FIG. 4 with valve in its open condition.

Inflation and deflation of the bladder takes place through an inflation passage 40. The inflation passage extends through one of the web members 30, into the hub 32, and into the bladder support member 34, as best seen in FIG. 5. It is preferred that the inflation passage 40 leads to an annular groove 40a located on the underside of the hub 32, the groove serving as a manifold for the operating fluid used to inflate the bladder. Within the bladder support member the inflation passage divides into a series of sub-passages 42 which pass out of the bladder support 42 in the region of the centre of the bladder 22 to ensure even inflation of the bladder. Thus, the inflation passage 40 is shown as comprising a plurality of separate sub-passages 42 in the bladder support member. Preferably there are four radially spaced sub-passages 42. The sub-passages 42 open into an annular groove 43 located towards the centre of the bladder support member, the groove 43 ensuring that the compressed air entering the space between the bladder and the bladder support is evenly distributed around the bladder support, thereby ensuring even and symmetric inflation and deflation of the bladder.

Near the end of the inflation passage 40 remote from the bladder the inflation passage bifurcates into two passages, an exhaust passage 21, and an inlet passage 28. The inlet passage 28 will in use be connected to a source of high pressure fluid, typically compressed air, and the exhaust passage 21 will be connected via an exhaust manifold to a solenoid controlled exhaust valve or the like (not shown) which will either be open, in which can pressure fluid will exhaust from the inlet passage 28, or closed, in which case pressure air will not exhaust and will instead operate to inflate the bladder 22 to the inflated condition shown in FIG. 13.

A constricted throat 38 is provided in the inlet passage 28. The throat is intended to provide restricted flow of high pressure fluid through the exhaust passage when the exhaust valve is open. The throat is, however, of sufficient diameter to enable the high pressure fluid to rapidly inflate the bladder when the exhaust valve is closed. Thus, when the exhaust valve is open high pressure fluid will bleed directly from the inlet passage, through the throat 38, to the exhaust passage. It is envisaged that the valve 10 will open faster than it closes, which is a preferred characteristic of a reverse pulse cleaning valve.

Although different dimensions and diameters of valve, flow passage, and inflation passage will be used in different operating conditions, the following parameters apply for a preferred valve used in reverse pule cleaning of filter elements. In this embodiment, the operating pressure of the air used for the reverse pulse will be approximately 100 kPa, and the operating pressure for the bladder will be approximately 350 kPa. The inlet passage and inflation passage will have a diameter of about 2 to 4 mm, and the exhaust passage a diameter of about 7 to 10 mm. The throat 38 may have a diameter of between 0.5 mm and 2 mm, preferably around 1.2 mm.

FIG. 12 shows a perspective view of two valves 10 attached to a box-shaped conduit 50. It should be noted that not all of the reference numerals of the valve 10 are represented here for clarity purposes. The conduit pipe 50 is connected to a source of high pressure air (±100 kPa in this embodiment) which travels in the conduit 50 as shown by arrow 52. The conduit 50 includes three equally spaced openings 54 to which the inlet sides of the valves 10 are attached. The valves are secured in position by bolts 56.

The conduit 50 includes a high pressure fluid passage 58 which extends along the length of the conduit 50 to provide high pressure control fluid adapted to connect to the inlet passage 28 for inflation of the bladder 22. As mentioned above, the control fluid will be at relatively high pressure, say about 350 kPa in this embodiment.

It will be noted that the inlet passage 28 enters the valve body through the end face 29 (adjacent the inlet 16) of the valve. Thus, the opening to the inlet passage will be flush against the conduit 50 when the valve is mounted in position, as shown in FIG. 12. The secondary passage 58 has an opening 60 adjacent each valve opening 54, and when the valves 10 are properly mounted in position the pilot valve openings will be in register with the inlet passage 28, thereby ensuring that each valve is directly coupled to the source of high pressure fluid necessary for inflation of the bladder 22.

The exhaust passages 21 will be coupled to an exhaust manifold (not shown) which is turn will be valve controlled, in the manner described above.

It will be noted that the arrangement described above will ensure rapid inflation and deflation of the bladder. Typically the bladder will contain relatively low volume of compressed air in the inflation condition, and will inflate rapidly when the exhaust valve shuts off. It is envisaged that the bladder itself will be formed of a relatively high strength resilient rubber, or elastomeric material so that it will rapidly adopt its deflated condition when the exhaust valve is opened The resilience of the rubber will assist deflation, but since the internal pressure is high, relative to atmospheric pressure, and the external pressure around the outside of the diaphragm is high, the bladder will very rapidly collapse to a deflated condition when the exhaust valve is opened.

It will be appreciated that the bladder is optimally situated relatively close to the valve seat 45 when in the deflated or open condition. The annular space around the bladder will preferably not be more flow restrictive than the flow passage 17 in at least some other regions of the valve. The bladder support member will support the collapsed or deflated bladder in this region of close proximity, so that when inflation occurs the bladder need only expand a relatively small distance in order to effect closure of the valve.

It will also be appreciated that the bladder is fully supported by the bladder support member along its full length when in its deflated condition due to the form and diameter of the bladder support member. Thus the bladder will not be subjected to high pressure buffeting whilst fluid is flowing through the valve, but will rather form a smooth, flow guiding component in the central region of the valve.

To replace the bladder for maintenance purposes the bolt 30 will be removed, allowing the bladder support member to be removed, the bladder replaced, and the valve reassembled. Since the bladder is the only moving part of the valve, it is envisaged that such maintenance could be completed relatively quickly.

Turning now to FIGS. 14 to 16 of the drawings, a second embodiment of valve is shown. The only significant difference between this valve and that of the previous embodiment is the manner of opening and closing the valve. The numbering system used with the previous embodiment has been used with this embodiment other than where the items differ.

As shown in FIGS. 14 and 15, a valve 68 has a mounting flange 70 on the inlet side thereof which is circular rather than square, thus providing for a different mounting arrangement with the air supply conduit. A union nut, or like mounting arrangement will be used for providing a tight seal between the valve and the air supply conduit. An annular groove 72 is provided in the end face 74 of the valve to provide a recess for an O-ring seal. It will be noted that the end face 74 does not have an inlet port for high pressure operating air as was required with the previous embodiment.

In this embodiment, inflation and deflation of the bladder takes place through the same inflation passage 76. The inflation passage extends through the hub 32 into the bladder support 34, as in the previous embodiment. However, in this embodiment the inflation and deflation of the valve is controlled through the same port 78 located at the end of the inflation passage remote from the bladder 22. The port 78 is located in a side wall of the valve, and would in use have a high pressure conduit connected thereto which would supply the operating fluid, typically compressed air. It will be noted that a bleed passage 80 extends from the inflation passage 76 into the flow passage 17 through the valve. The bleed passage 80 will bleed high pressure fluid when the valve is closed, but because of the constricted diameter of the bleed passage 80, not a great flowrate of compressed air will flow through the passage 80. However, the passage 80 will assist in the rapid opening of the valve when the operating fluid is no longer supplied to the bladder, allowing the air within the bladder to discharge through the passage 80, thereby ensuring rapid deflation of the bladder.

It is envisaged that the diameter "d" of the valve shown in the drawings will be about 45 mm, and the throat of the valve will have an internal diameter of about 22 mm and the valve seat 45 will have a diameter of about 37 mm. This valve will be intended to operate to control the flow of cleaning air at approximately 100 kPa, and the pressure of the operating air used to expand the bladder will be about 350 kPa.

It will be apparent to those skilled in the art to make various changes, alterations and modifications to the invention described herein. To the extent those various changes, alterations and modifications do not depart from the spirit and scope of the appended claims, they are intended to be encompassed therein.

The invention claimed is:

1. A bladder valve comprising:
   a valve body having an inlet, an outlet and a flow passage connecting the inlet and outlet the inlet, outlet and flow passage being in axial alignment with each other:
   a valve seat surrounding said flow passage;
   a mounting hub mounted to the valve body within the flow passage by means of one or more fixed vanes or web members which extend radially between the hub and the valve body, said mounting hub being axially aligned with the flow passage:
   a bladder support member extending downstream of said hub, said bladder support member having a frusto conical configuration and being axially aligned with said flow passage:
   a bladder surrounding said bladder support member having a generally cylindrical configuration, said bladder being inflatable from a deflated condition in which the inner surface of the bladder is in contact with and supported by the bladder support member and the flow passage is open and an inflated condition in which the outer surface of the bladder is in contact with the said valve seat and the flow passage is closed;
   an inflation passage extending through said hub and said bladder support member along one of said vanes or web members for inflating said bladder, said inflation passage bifurcates into two arms at a point along its length at a position remote from the bladder support, one arm serving as an inlet passage for the supply of fluid under pressure to inflate said bladder, and the other arm serving as an exhaust passage through which said fluid under pressure is evacuated from the bladder to deflate the bladder.

2. A bladder valve according to claim 1, wherein the mounting hub is of cone or cowl shape diverging in a direction from the inlet to the outlet.

3. A bladder valve according to claim 2, wherein the diameter of the hub at its widest point is substantially the same as the diameter of the bladder support member.

4. A bladder valve according to claim 2, wherein the bladder support member is mounted to the hub, the connection arrangement between the hub and the support member being such that the bladder is clamped between the hub and the bladder support member.

5. A bladder valve according to claim 1, wherein the valve includes a shroud on the outlet side thereof which is axially aligned with the outlet, the shroud being mounted to the hub.

6. A bladder valve according to claim 1, wherein the bladder is of tubular or cylindrical configuration with opposite ends open, one end being clamped between the bladder support member and the hub, and the opposite end being clamped between the bladder support member and the shroud.

7. A bladder valve according to claim 6, wherein each end of the bladder has an annular sealing ring integrally formed therewith, said sealing rings being located in corresponding annular grooves in the hub and/or the bladder support, and/or the shroud respectively.

8. A bladder support according to claim 6, wherein the shroud and bladder support are mounted to the hub by means of a connection rod or threaded bolt which passes through the shroud and bladder support member into the hub.

9. A bladder support according to claim 7, wherein the shroud and bladder support are mounted to the hub by means of a connection rod or threaded bolt which passes thou& the shroud and bladder support member into the hub.

10. A bladder valve according to claim 1, wherein the inlet passage includes a narrow diameter throat, to restrict the flow of fluid into the bladder, the exhaust passage not being so restricted so that the evacuation of fluid from the bladder is relatively unrestricted.

11. A bladder valve according to claim 10, wherein the inlet passage is permanently connected to a source of fluid under pressure in use, and the exhaust passage is operable between open and closed conditions, the bladder being inflated when the exhaust passage is closed, and deflated when the exhaust passage is opened, fluid under pressure bleeding—from the inlet passage—to the exhaust passage when the exhaust passage is open.

12. A bladder valve according to claim 1, wherein the inflation passage divides to a plurality of outlet nozzles located in the bladder support member, the outlet nozzles radially spaced around the bladder support member to facilitate even inflation and deflation of the bladder.

* * * * *